(12) United States Patent
Hsu

(10) Patent No.: US 7,524,184 B2
(45) Date of Patent: Apr. 28, 2009

(54) MECHANISM FOR ADJUSTING RELATIVE POSITIONS OF MULTIPLE INJECTION NOZZLES OF AN INJECTION APPARATUS

(75) Inventor: Sheng-Tzu Hsu, Taipei (TW)

(73) Assignee: King Steel Machinery Co., Ltd., Taichung (TW)

( * ) Notice: Subject to any disclaimer, the term of this patent is extended or adjusted under 35 U.S.C. 154(b) by 224 days.

(21) Appl. No.: 11/448,783

(22) Filed: Jun. 8, 2006

(65) Prior Publication Data
US 2007/0237853 A1 Oct. 11, 2007

(30) Foreign Application Priority Data
Apr. 7, 2006 (TW) .............................. 95112535 A

(51) Int. Cl.
*B29C 45/22* (2006.01)

(52) U.S. Cl. .................. 425/570; 425/572; 425/573; 425/574

(58) Field of Classification Search .................. 425/572, 425/574, 575, 570, 573, 567
See application file for complete search history.

(56) References Cited

U.S. PATENT DOCUMENTS 3,464,091 A * 9/1969 Friedrich .................... 425/574
5,183,621 A * 2/1993 Yukihiro et al. ............. 425/574

* cited by examiner

*Primary Examiner*—Tim Heitbrink
(74) *Attorney, Agent, or Firm*—Troxell Law Office, PLLC

(57) ABSTRACT

A mechanism for adjusting relative positions of multiple injection nozzles of an injection apparatus. The mechanism includes a guide section serving as a rail horizontally extending in a predetermined direction; a first injection section having at least one injection nozzle and slidably disposed on the rail, whereby the first injection section is guidable by the rail to horizontally move along X-axis defined by the rail; and a second injection section having at least one injection nozzle and slidably disposed on the rail. The second injection section is spaced from the first injection section by a distance and guidable by the rail to horizontally move along X-axis defined by the rail. The second injection section is further vertically movable within a predetermined range of height along Y-axis normal to X-axis.

7 Claims, 8 Drawing Sheets

MECHANISM FOR ADJUSTING RELATIVE POSITIONS OF MULTIPLE INJECTION NOZZLES OF AN INJECTION APPARATUS

BACKGROUND OF THE INVENTION

The present invention is related to a technique for molding and processing polymer material, and more particularly to a mechanism for adjusting relative positions of multiple injection nozzles of an injection apparatus.

FIG. 1 shows a conventional injection bed adjustment structure 1. Two injection cylinders 2, 3 are side by side arranged on a base seat 4. The base seat 4 is slidably disposed on a bed 6 via several guide rods 5. The bed 6 has several rail channels 7, whereby the bed 6 is slidable along preset rails. The guide rods 5 are normal to the rail channels 7 so that the base seat 4 can be driven to two-dimensionally move along X-axis defined by the guide rods 5 and Y-axis defined by the rail channels 7. Accordingly, the relative positions of the two injection cylinders 2, 3 can be adjusted to meet the actual requirements.

However, according to the above arrangement, the injection nozzles of the two injection cylinders 2, 3 are synchronously moved along Y-axis and the space between the two injection nozzles is kept constant. In other words, the two injection nozzles are always positioned on the same horizontal plane. Under such circumstance, in the case that the material-filling apertures of the mold are not positioned on the same horizontal plane, the above measure will be unable to fill the material into the mold. Accordingly, the material-filling apertures of the mold must be such designed to be formed on the same horizontal plane. Therefore, the design of the mold is limited. As a result, the mold may be inevitably designed with elongated pouring channel or not optimal structure.

SUMMARY OF THE INVENTION

It is therefore a primary object of the present invention to provide a mechanism for adjusting relative positions of multiple injection nozzles of an injection apparatus. By means of the mechanism, the relative positions of multiple injection nozzles can be adjusted in accordance with the positions of the material-filling apertures of the mold.

It is a further object of the present invention to provide the above mechanism for adjusting relative positions of multiple injection nozzles of the injection apparatus. By means of the mechanism, the relative positions of the injection nozzles can be quickly switched to exchange the positions where the different materials are filled into the mold. Accordingly, it is unnecessary to wash out the material and replace the material.

According to the above objects, the mechanism for adjusting relative positions of multiple injection nozzles of the injection apparatus of the present invention includes a guide section serving as a rail horizontally extending in a predetermined direction; a first injection section having at least one injection nozzle and slidably disposed on the rail, whereby the first injection section is guidable by the rail to horizontally move along X-axis defined by the rail; and a second injection section having at least one injection nozzle and slidably disposed on the rail. The second injection section is spaced from the first injection section by a distance and guidable by the rail to horizontally move along X-axis defined by the rail. The second injection section is further vertically movable within a predetermined range of height along Y-axis normal to X-axis.

The present invention can be best understood through the following description and accompanying drawings wherein:

DETAILED DESCRIPTION OF THE PREFERRED EMBODIMENTS

Figure 1:
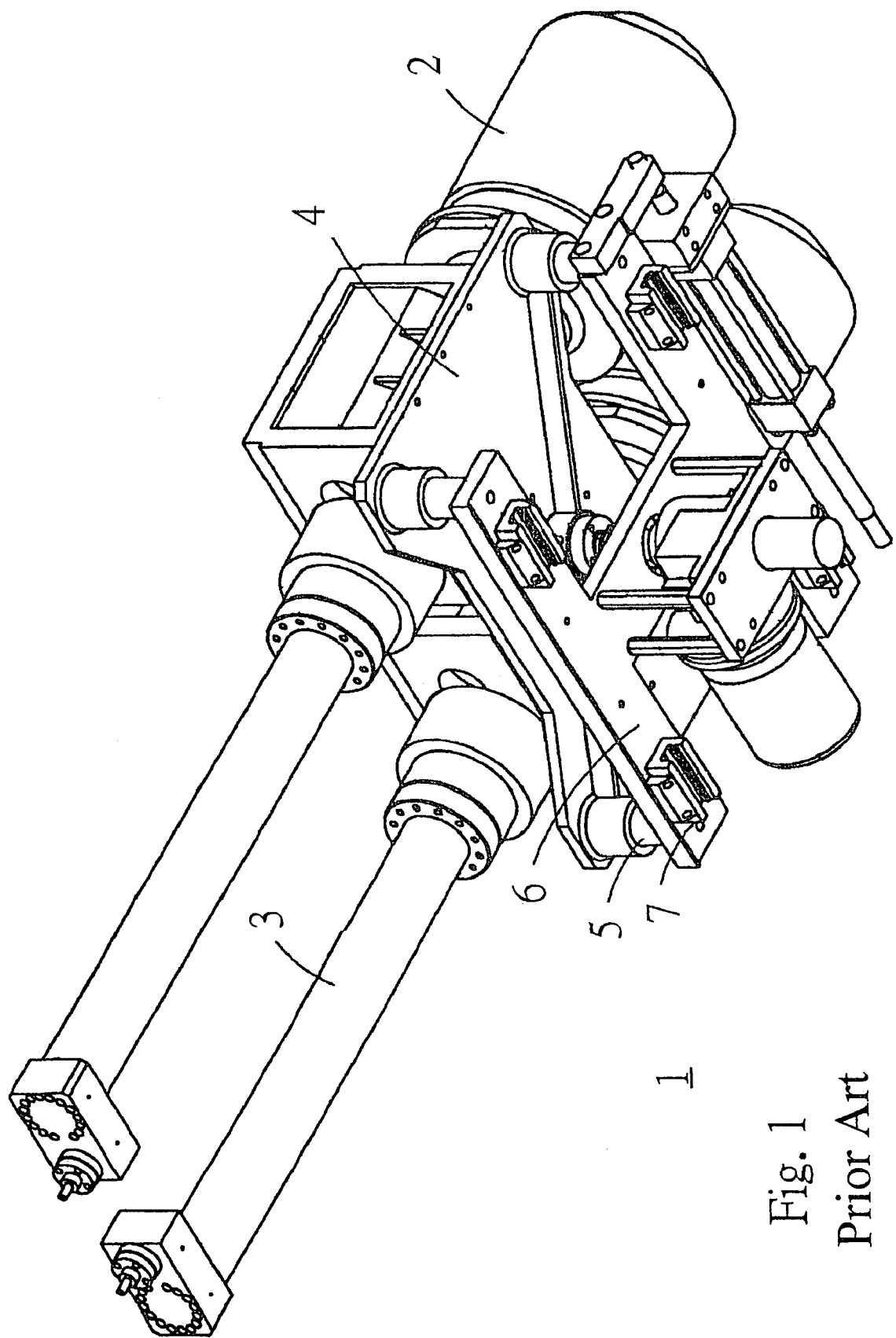
FIG. 1 is a perspective view of a conventional adjustment structure.

Please refer to FIGS. 2 to 5. According to a preferred embodiment, the adjustment mechanism 10 of the present invention includes a guide section 20, a first injection section 30 and a second injection section 40.

The guide section 20 is a straight body formed with a linear rail 21 on which the first and second injection sections 30, 40 are slidably mounted.

The first injection section 30 has a first slide seat 31 slidably disposed on the rail 21. The first injection section 30 is guidable by the rail 21 and drivable by an external power to reciprocally move along X-axis defined by the rail 21. A cylindrical first injection cylinder 32 is slidably disposed on the first slide seat 31. The first injection cylinder 32 is drivable by an external power to reciprocally vertically move within a certain range of height along Y-axis normal to X-axis. A first injection nozzle 33 is arranged one end of the shaft of the first injection cylinder 32. Accordingly, the first injection section 30 is controllably movable along X-axis or Y-axis.

The second injection section 40 has a second slide seat 41 slidably disposed on the rail 21. The second injection section 40 is guidable by the rail 21 and drivable by an external power to reciprocally move along X-axis defined by the rail 21. A cylindrical second injection cylinder 42 is slidably disposed on the second slide seat 41. The second injection cylinder 42 is drivable by an external power to reciprocally vertically move within a certain range of height along Y-axis normal to X-axis. A second injection nozzle 43 is arranged one end of the shaft of the second injection cylinder 42. Accordingly, the second injection section 40 is controllably movable along X-axis or Y-axis.

According to the above arrangement, the relative positions of the first and second injection nozzles 33, 43 can be readily adjusted in accordance with the actual requirement of the manufacturing procedure.

Figure 2:
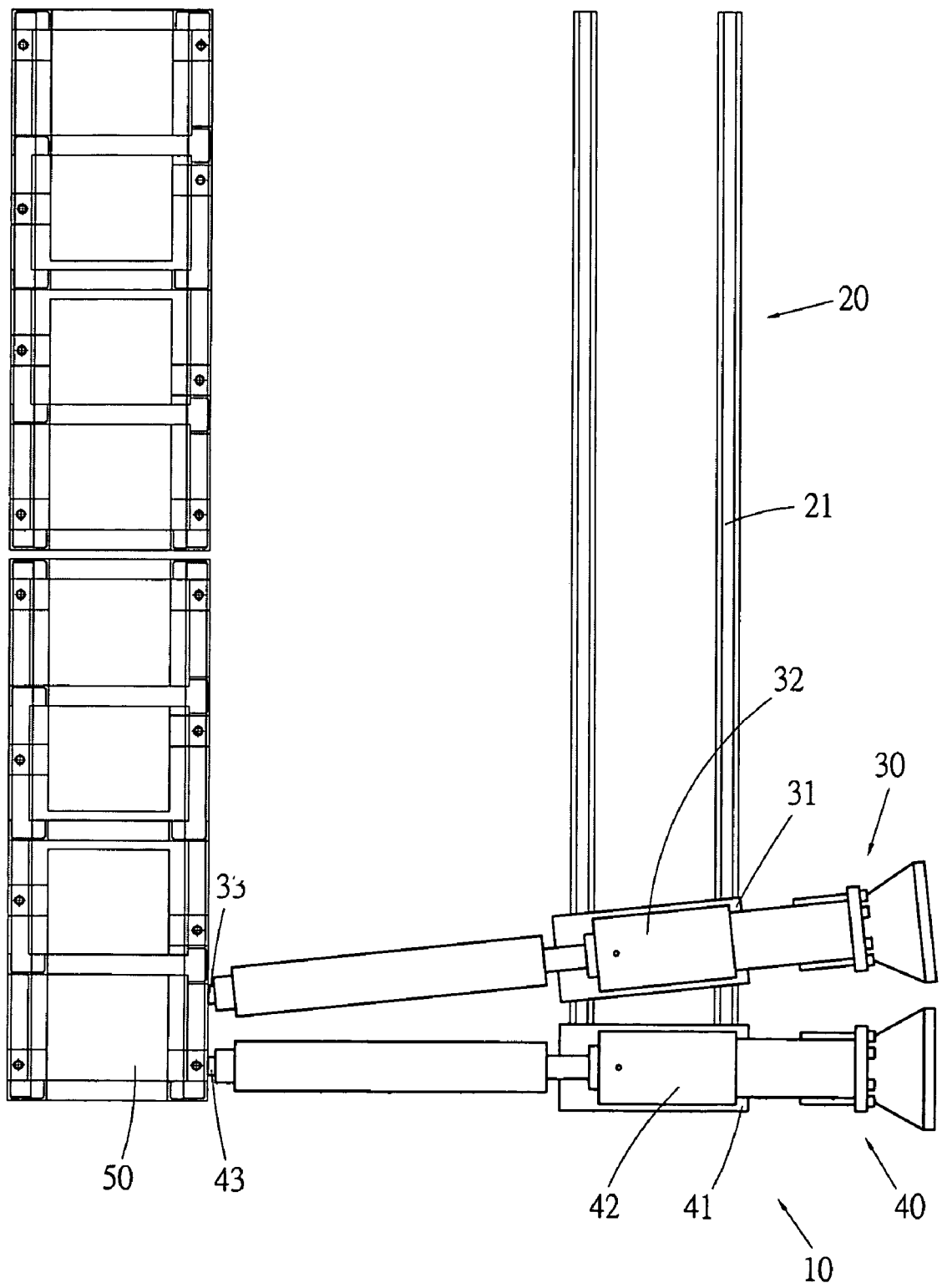
FIG. 2 is a plane view of a preferred embodiment of the present invention, showing that the two injection sections fill the material into the same mold.
Figure 3:
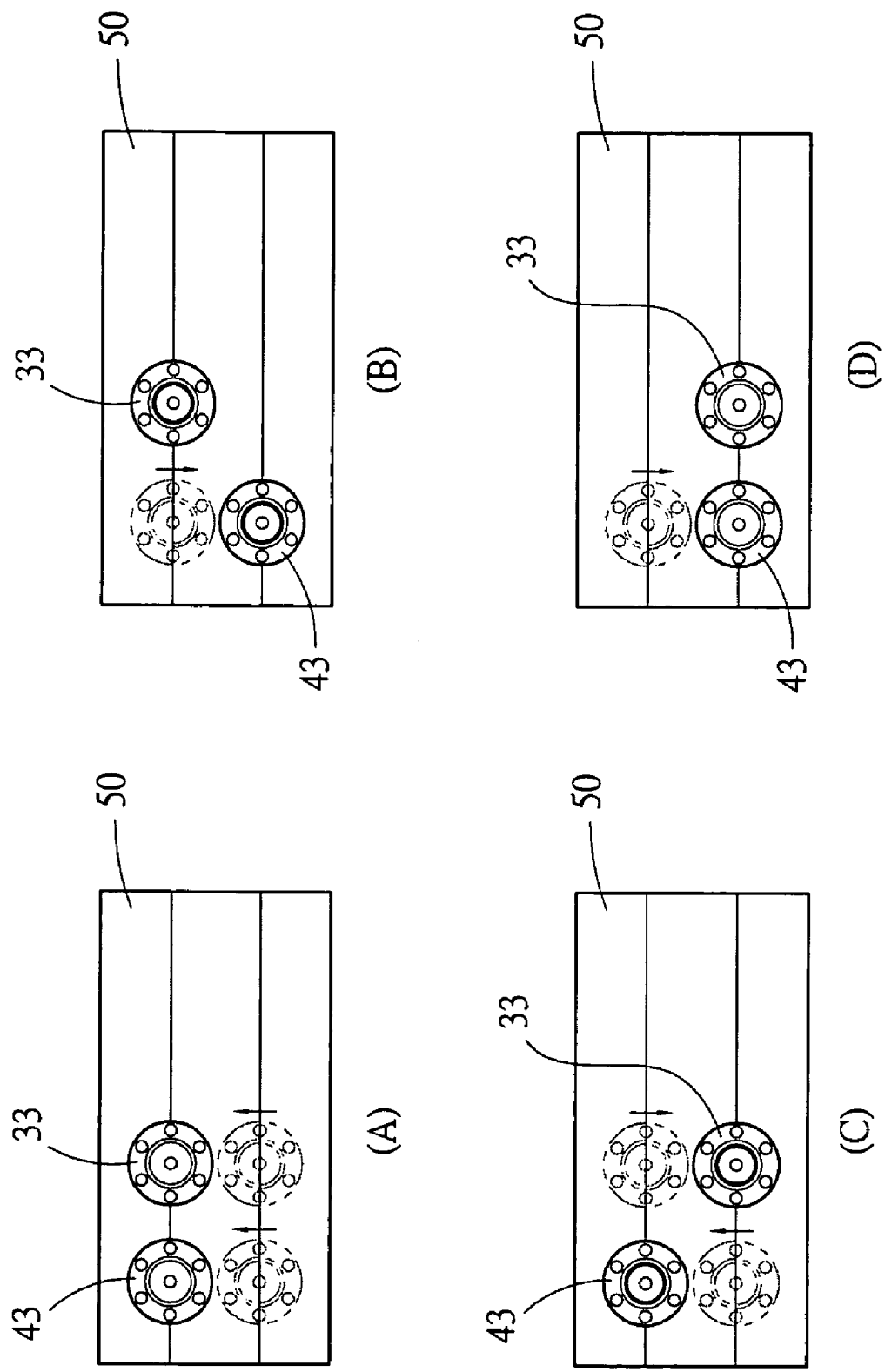
FIG. 3 shows several end views of the preferred embodiment of the present invention and shows several patterns of the adjusted injection sections corresponding to the positions of the material-filling apertures of the mold.

The embodiment of FIGS. 2 and 3 is exemplified. The first and second injection sections 30, 40 are moved along X-axis. The distance d between the first and second injections 30, 40 is such adjusted that the first and second injection nozzles 33, 43 can fill the material into two material-filling apertures of the same mold 50. Then, according to the relative positions of the two material-filling apertures of the mold, the first injection section 30 or the second injection section 40 is selectively vertically moved along Y-axis. To speak more detailedly, the first injection section 30 or the second injection section 40 is moved to adjust the relative positions of the first and second injection nozzles 33, 43 as the five patterns shown in FIG. 3. The first and second injection sections 30, 40 can be independently transversely moved and ascended/descended to widen the application range of the present invention and enhance the production efficiency. In addition, in the case that the first and second injection sections 30, 40 fill different materials into the material-filling apertures, the relative positions of the first and second injection nozzles 33, 43 can be switched to exchange the positions where the different materials are filled into the mold. Accordingly, the mobility in application of the present invention is enhanced and it is unnecessary to wash out the material and replace the material.

Figure 4:
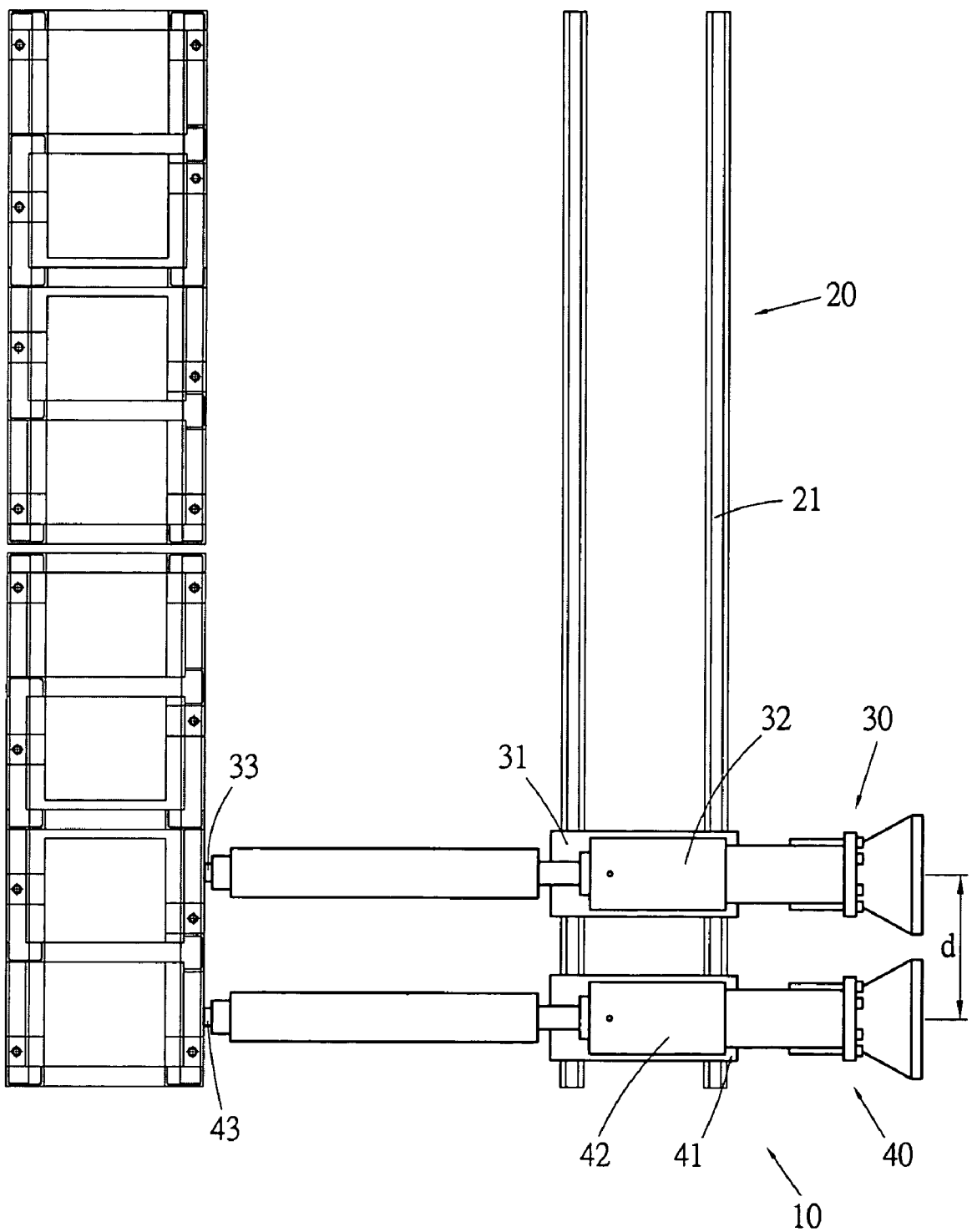
FIG. 4 is a plane view of the preferred embodiment of the present invention, showing that the two injection sections respectively fill the material into two adjacent molds.

In actual manufacturing procedure, the patterns of the relative positions of the first and second injection sections 30, 40 are not limited to the patterns of FIGS. 2 and 3. In fact, as shown in FIG. 4, the distance d between the first and second injection sections 30, 40 can be such adjusted that the first and second injection sections 30, 40 are respectively aligned with two adjacent molds. In addition, the first and second injection sections 30, 40 are guided by the guide section 20 to synchronously move along X-axis.

Figure 5:
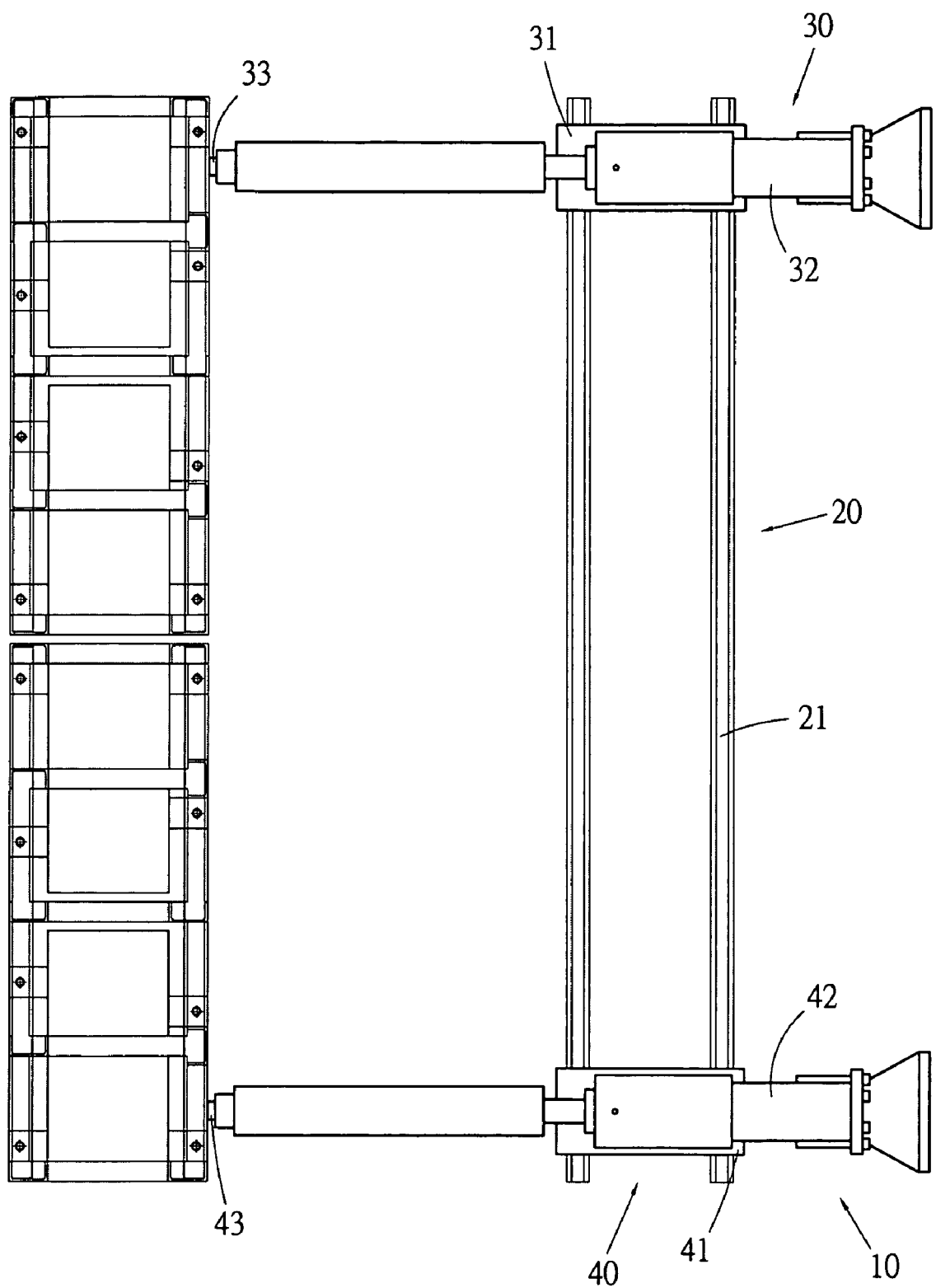
FIG. 5 is a plane view of the preferred embodiment of the present invention, showing that the two injection sections respectively fill the material into two molds distal from each other.
Figure 6:
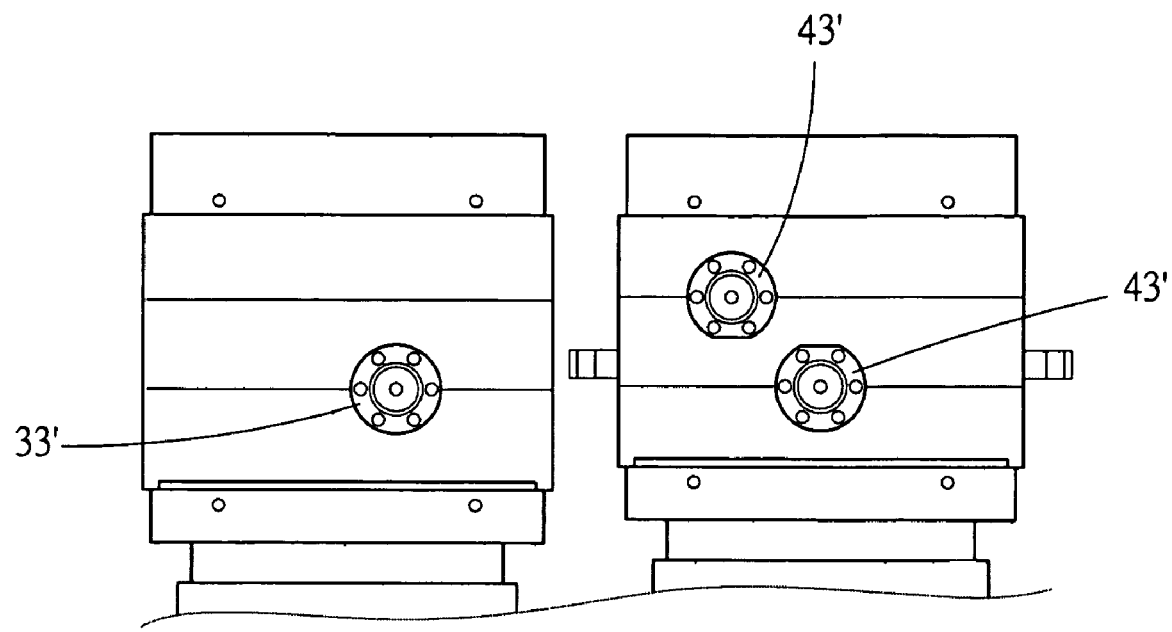
FIG. 6 is an end view of another embodiment of the present invention, showing that the injection sections are adjusted corresponding to different molds in one aspect.
Figure 7:
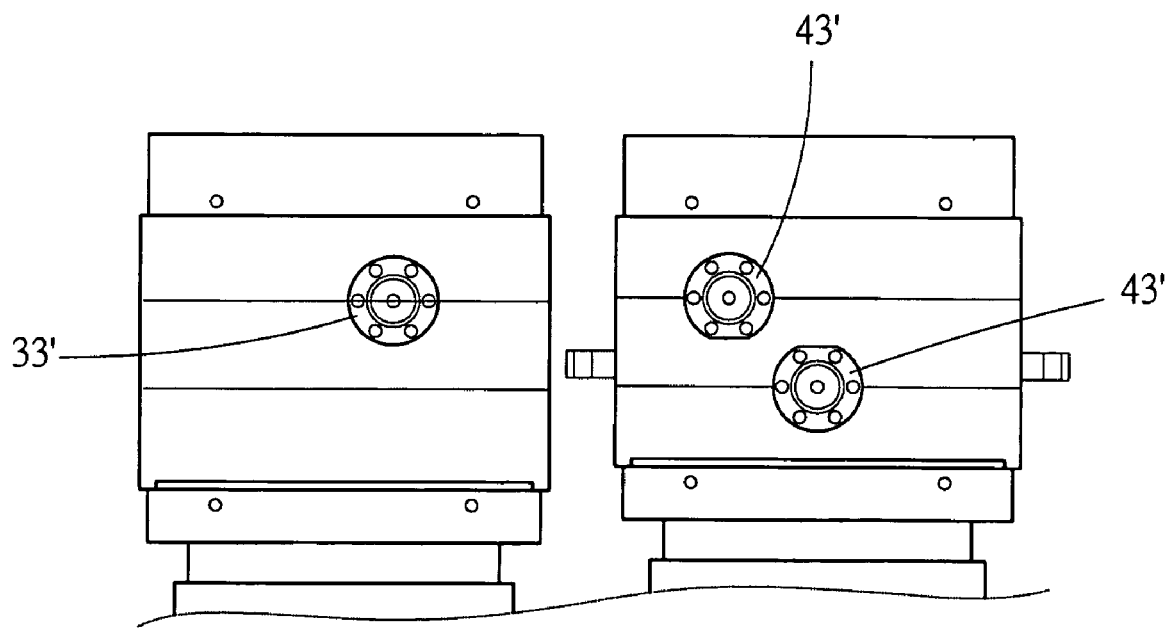
FIG. 7 is another end view of the other embodiment of the present invention, showing that the injection sections are adjusted corresponding to different molds in another aspect.
Figure 8:
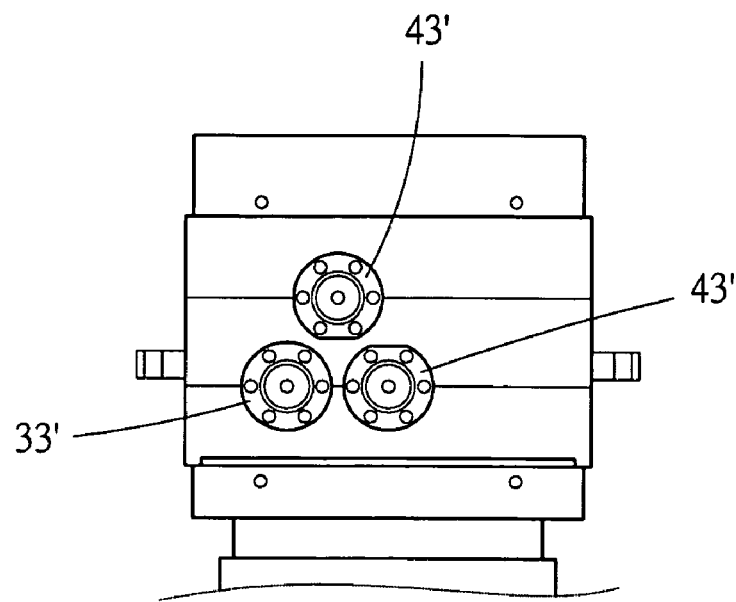
FIG. 8 is another end view of the other embodiment of the present invention, showing that the injection sections are adjusted corresponding to the same mold in one aspect.
Figure 9:
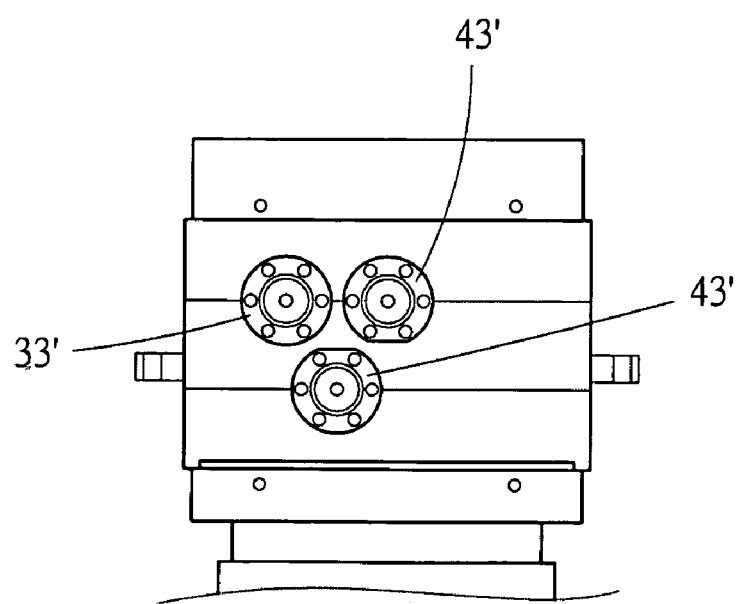
FIG. 9 is another end view of the other embodiment of the present invention, showing that the injection sections are adjusted corresponding to the same mold in another aspect.
Figure 10:
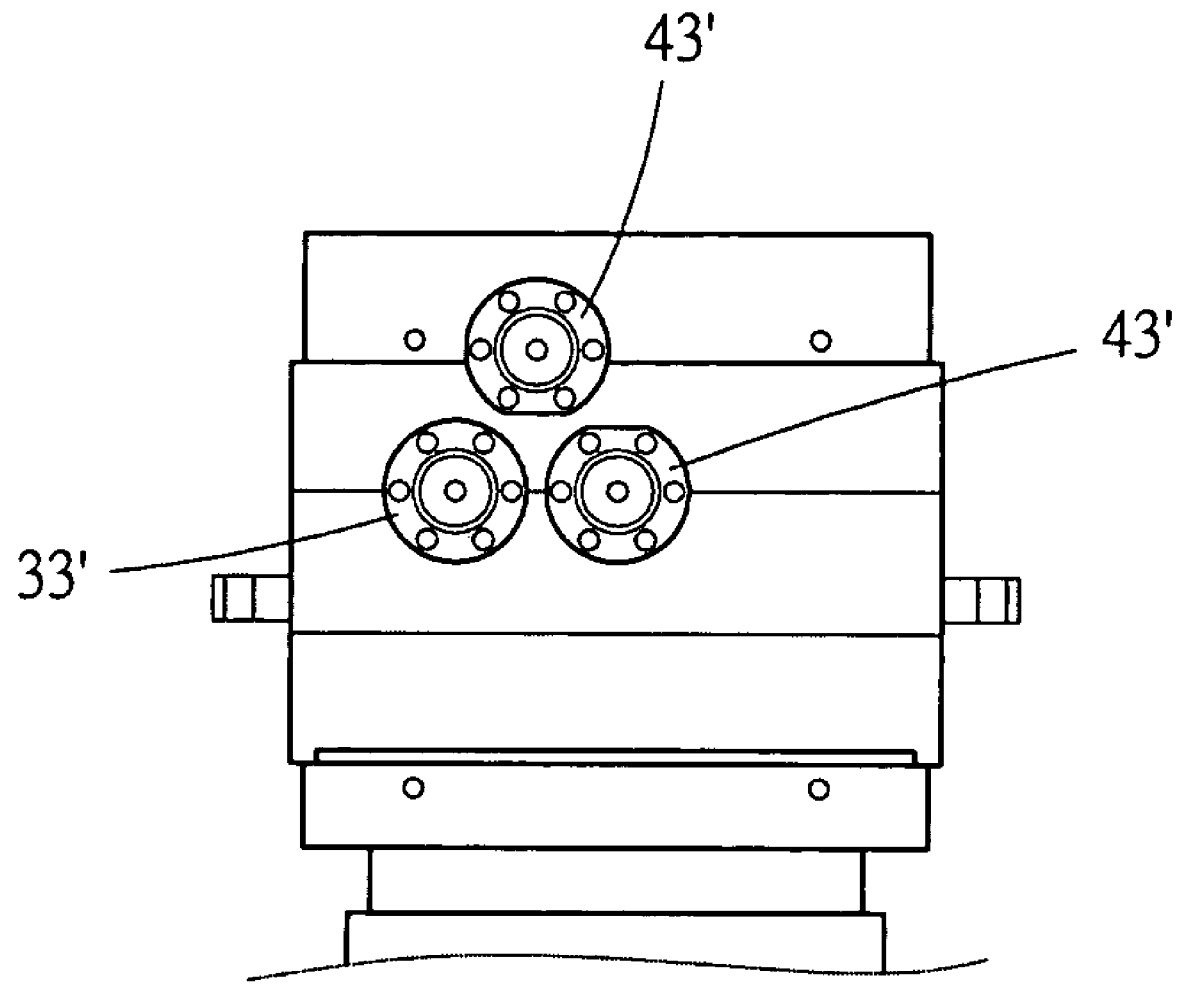
FIG. 10 is another end view of the other embodiment of the present invention, showing that the injection sections are adjusted corresponding to the same mold in still another aspect.

Alternatively, as shown in FIG. 5, the first injection section 30 is located at the first station of a straight multi-mold manufacturing procedure and the second injection section 40 is reciprocally moved along X-axis between the other stations to fill the material into the molds.

It should be noted that the second injection section 40 can transmit a power to the first injection section 30 to move along X-axis. In other words, the first slide seat 31 and the second slide seat 41 can be detachably connected, whereby the first injection section 30 is drivable by the second injection section 40 to reciprocally move along X-axis along with the second injection section 40 as shown in FIG. 4. After the first and second slide seats 31, 41 are disconnected, the first injection section 30 is located at a certain mold station without any driving power along X-axis.

FIGS. 6 to 10 show another embodiment of the mechanism for adjusting relative positions of multiple injection nozzles of an injection apparatus of the present invention. This embodiment is substantially identical to the above embodiment. The only difference between the two embodiments is that the second injection has two second injection cylinders and two second injection nozzles 43'. The two second injection cylinders and the two second injection nozzles 43' are synchronously moved along X-axis or Y-axis. The first injection nozzle 33' of the first injection section is identical to that of the above embodiment.

This embodiment can achieve the same effect as the above embodiment. However, the number of the injection nozzles is increased and the relative positions of these injection nozzles are still adjustable.

It should be further noted that the measure for slidably mounting the first and second injection sections on the guide section or the measure for guiding and driving the first or second injection section to move along X-axis or Y-axis pertains to prior art. Those measures for guiding and driving single injection section to move along X-axis or Y-axis are not included in the scope of the present invention. In other words, the present invention is characterized in that the two injection sections are independently movable along X-axis. With respect to the movement along Y-axis, the measure for guiding and driving one of the first and second injection sections to move along Y-axis should be included in the scope of the present invention.

The above embodiments are only used to illustrate the present invention, not intended to limit the scope thereof. Many modifications of the above embodiments can be made without departing from the spirit of the present invention.

What is claimed is:

1. A mechanism for adjusting relative positions of multiple injection nozzles of an injection apparatus, comprising:
   a guide section serving as a rail horizontally extending in a predetermined direction;
   a first injection section having at least one injection nozzle and slidably disposed on the rail, the first injection section is guidable by the rail to horizontally move along an X-axis defined by the rail; and
   a second injection section having at least one injection nozzle and slidably disposed on the rail, the second injection section being independent and spaced from the first injection section by distance, the second injection section being guidable by the rail to horizontally move along the X-axis defined by the rail and being vertically movable within a predetermined range of height along an Y-axis normal to the X-axis.

2. The mechanism for adjusting relative positions of multiple injection nozzles of the injection apparatus as claimed in claim 1, wherein the first injection section is guidable by the rail to horizontally move along the X-axis and vertically movable within a predetermined range of height along the Y-axis.

3. The mechanism for adjusting relative positions of multiple injection nozzles of the injection apparatus as claimed in claim 1, wherein the first injection section has two injection cylinders, the two injection cylinders being guidable by the rail to synchronously move along the X-axis with a space between the two injection cylinders being kept constant.

4. The mechanism for adjusting relative positions of multiple injection nozzles of the injection apparatus as claimed in claim 3, wherein each injection cylinder of the two injection cylinders has an injection nozzle, the injection nozzle of each of the two injection cylinders being arranged along the Y-axis vertically corresponding to each other.

5. The mechanism for adjusting relative positions of multiple injection nozzles of the injection apparatus as claimed in claim 1, wherein the second injection section has two injection cylinders, the two injection cylinders being guidable by the rail to synchronously move along the X-axis with a space between the two injection cylinders being kept constant, the two injection cylinders being also vertically movable along the Y-axis.

6. The mechanism for adjusting relative positions of multiple injection nozzles of the injection apparatus as claimed in claim 5, wherein each injection cylinder of the two injection cylinders has an injection nozzle, the injection nozzle of each of the two injection cylinders being arranged along the Y-axis vertically corresponding to each other.

7. The mechanism for adjusting relative positions of multiple injection nozzles of the injection apparatus as claimed in claim 1, wherein the first injection section and the second injection section are spaced apart a variable distance.

* * * * *